(12) United States Patent
Stowe et al.

(10) Patent No.: US 9,499,406 B1
(45) Date of Patent: Nov. 22, 2016

(54) METHODS FOR THE ADDITIVE MANUFACTURING OF SEMICONDUCTOR AND CRYSTAL MATERIALS

(71) Applicants: Ashley C. Stowe, Knoxville, TN (US); Douglas Speight, Knoxville, TN (US)

(72) Inventors: Ashley C. Stowe, Knoxville, TN (US); Douglas Speight, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 0 days.

(21) Appl. No.: 14/752,048

(22) Filed: Jun. 26, 2015

(51) Int. Cl.
| | |
|---|---|
| *B01D 9/00* | (2006.01) |
| *C01B 19/00* | (2006.01) |
| *C09K 11/88* | (2006.01) |
| *H01B 1/06* | (2006.01) |
| *B01J 19/12* | (2006.01) |
| *B01J 19/08* | (2006.01) |

(52) U.S. Cl.
CPC ............ *C01B 19/002* (2013.01); *B01J 19/085* (2013.01); *B01J 19/121* (2013.01); *B01J 19/128* (2013.01); *C09K 11/881* (2013.01); *H01B 1/06* (2013.01); *B01J 2219/0871* (2013.01); *B01J 2219/1203* (2013.01)

(58) Field of Classification Search
CPC .......... B01D 9/005; B01D 9/00; C01C 1/245
USPC ........................................................ 23/300
See application file for complete search history.

(56) References Cited

U.S. PATENT DOCUMENTS

| | | | |
|---|---|---|---|
| 4,534,822 | A | 8/1985 | Sashital |
| 7,687,780 | B2 | 3/2010 | Bell et al. |

OTHER PUBLICATIONS

O. Balachninaite, L. Petraviciute, M. Maciulevicius, V. Sirutkaitis, L. Isaenko, S. Lobanov, A. Yelisseyev, J.-J. Zondy; Absorptance and scattering losses measurements of the mid-infrared nonlinear crystals LiInSe2 and LiInS2 in the IR range.; ISSN 1392-2114 ULTRAGARSAS Nr.3(60). 2006.

L. Isaenko, A. Yelisseyev, S. Lobanov, A. Titov, V. Petrov, J.-J. Zondy, P. Krinitsin, A. Merkulov, V. Vedenyapin, J. Smironova; "Growth and properties of LiGaX2 (X-S, Se, Te) single crystals for nonlinear optical applications in the mid-IR"; Crys. Res. Technol. 38, No. 3-5, 379-387 (2003) / DO1 10.1002/crat.200310047.; 2003 WILEY-VCH Verlag GmbH & Co. KGaA, Wenheim 0232-1300/03/3-504-0379.

L. Isaenko, P. Krinitsin, V. Vedenyapin, A. Yelisseyev, A. Merkulov, J.-J. Xondy, and V. Petrov; "LiGaTe2: A New Highly Nonlinear Chalcopyrite Optical Crystal for the Mid-IR"; Crystal Growth & Design, vol. 5. No. 4 1325-1329, 2005.

*Primary Examiner* — Edward Johnson
(74) *Attorney, Agent, or Firm* — Clements Bernard PLLC; Christopher L. Bernard; Lawrence A. Baratta, Jr.

(57) ABSTRACT

A method for the additive manufacturing of inorganic crystalline materials, including: physically combining a plurality of starting materials that are used to form an inorganic crystalline compound to be used as one or more of a semiconductor, scintillator, laser crystal, and optical filter; heating or melting successive regions of the combined starting materials using a directed heat source having a predetermined energy characteristic, thereby facilitating the reaction of the combined starting materials; and allowing each region of the combined starting materials to cool in a controlled manner, such that the desired inorganic crystalline compound results. The method also includes, prior to heating or melting the successive regions of the combined starting materials using the directed heat source, heating the combined starting materials to facilitate initial reaction of the combined starting materials. The method further includes translating the combined starting materials and/or the directed heat source between successive locations. The method still further includes controlling the mechanical, electrical, photonic, and/or optical properties of the inorganic crystalline compound.

11 Claims, 3 Drawing Sheets

METHODS FOR THE ADDITIVE MANUFACTURING OF SEMICONDUCTOR AND CRYSTAL MATERIALS

STATEMENT REGARDING FEDERALLY SPONSORED RESEARCH OR DEVELOPMENT

The U.S. Government has rights to the present disclosure pursuant to Contract No. DE-NA0001942 between the U.S. Department of Energy and Consolidated Nuclear Security, LLC.

FIELD OF THE DISCLOSURE

The present disclosure relates generally to methods and systems for the additive manufacturing of inorganic crystalline materials. More specifically, the present disclosure relates to methods and systems for the additive manufacturing of semiconductors, scintillators, laser crystals, and optical filter crystalline materials such that their mechanical, electrical, photonic, and optical properties may be controlled.

BACKGROUND OF THE DISCLOSURE

Currently, semiconductor materials, as well as laser crystals and scintillators, are used for a variety of applications, from microelectronics and medical imaging to nonlinear optics and radiation detection. These semiconductor materials are typically prepared in bulk using crystal growth techniques that require the expenditure of significant time and energy, as well as the use of highly pure starting materials. Thin film materials are typically prepared via complex chemical or physical vapor deposition techniques, which again require the expenditure of significant time and energy. Such approaches are industry standard and expensive. Further, for such bulk crystals, post-growth fabrication is often required to create a material appropriately sized for a final assembled device.

Reduction of cost and improvement in quality for preparing these inorganic crystalline materials are the two primary concerns regarding their development and use. The growth of additive manufacturing and 3-D printing technologies creates new opportunities to address these concerns. In traditional metal/metal alloy and plastics manufacturing, significant cost savings have been realized through additive manufacturing and 3-D printing technologies with consistent reliability. Further, the metallographic properties of metal components manufactured using such techniques appear to be comparable to those of traditionally fabricated components. Additive manufacturing and 3-D printing techniques, however, generally have not been applied to control functional properties of metal/metal alloy and plastics beyond shape and metallurgy, and in particular, have not been applied to define and control functional properties (e.g., electrical, photonic, and optical properties) of inorganic crystalline solids, such as semiconductors, scintillators, laser crystals, and optical filters. Applying additive manufacturing techniques to inorganic crystalline materials as described herein can result in material conservation similar to that observed for metal/metal alloy and plastic materials formed through additive manufacturing, and thus result in similar significant manufacturing cost reductions, and can also result in improved quality. Furthermore, additive manufacturing of inorganic crystalline materials can save time and corresponding costs by concurrently accomplishing two or more traditionally sequential steps of purification, synthesis, crystal growth, and fabrication of the desired compound.

BRIEF SUMMARY OF THE DISCLOSURE

In various exemplary embodiments, the present disclosure provides methods and systems for the additive manufacturing of inorganic crystalline materials, rather than using time-consuming and costly bulk crystal growth, chemical vapor deposition, or high-vacuum physical vapor deposition techniques to grow such inorganic crystalline materials. Starting materials are physically combined and optionally thermally heated (in an oven/furnace) to facilitate the initial reaction. A directed heat source, such as a laser, electron beam, or infrared radiation, is then used to additively manufacture the crystals by precisely locally heating regions within the charge above the alloying point in succession, thus forming the final compound into a highly pure, uniform single crystalline product. Another approach is to synthesize the compound prior to additive manufacturing and then use the sequentially directed heat source to take very small regions above the melting point in order to melt the material in succession. As the directed heat source moves to an adjacent region within the charge, the previous location begins to cool and crystallize. Various directed heat source energy regimes (i.e., laser wavelengths, electron beam energy, and infrared wavelengths) may be used to optimize additive manufacturing conditions, as each semiconductor material absorbs different wavelengths or reacts differently. In this manner, exotic designs may be manufactured and localized defects may be removed.

In one exemplary embodiment, the present disclosure provides a method for the additive manufacturing of semiconductor and crystal materials, including: physically combining a plurality of starting materials that are used to form a semiconductor or crystal compound; heating or melting successive regions of the combined starting materials using a directed heat source having a predetermined wavelength or other energy characteristic, thereby facilitating the reaction of the combined starting materials; and allowing each region of the combined starting materials to cool in a controlled manner, such that the desired semiconductor or crystal compound results. The method also includes, prior to heating or melting the successive regions of the combined starting materials using the directed heat source, heating the combined starting materials in an oven or heater to facilitate initial reaction of the combined starting materials. The method further includes translating the combined starting materials and/or the directed heat source between successive locations. The method still further includes controlling the directed heat source energy exposure and/or cooling profile to control the mechanical, electrical, photonic, and/or optical properties of the crystalline compound. Controlling one or more of these properties allows inorganic crystalline compounds to be configured for use, for example, in microelectronics, ionizing radiation detection, and as optical filters in non-linear optical applications.

In another exemplary embodiment, the present disclosure provides a system for the additive manufacturing of inorganic crystalline materials, including: a mixing mechanism for physically combining a plurality of starting materials that are used to form an inorganic crystalline compound; a directed heat source having a predetermined wavelength or other energy characteristic for heating or melting successive regions of the combined starting materials, thereby facilitating the reaction of the combined starting materials; and a cooling mechanism for allowing each region of the combined starting materials to cool in a controlled manner, such that the desired crystalline compound results. The system also includes an oven or heater for, prior to heating or melting the successive regions of the combined starting materials using the directed heat source, heating the combined starting materials to facilitate initial reaction of the combined starting materials. The system further includes a translation stage for translating the combined starting materials and/or the directed heat source between successive locations. The system still further includes a controller for controlling directed heat source energy exposure and/or cooling profile to control the mechanical, electrical, photonic, and/or optical properties of the crystalline compound.

BRIEF DESCRIPTION OF THE DRAWINGS

The present disclosure is illustrated and described herein with reference to the various drawings, in which like reference numbers are used to denote like method steps/system components, as appropriate, and in which.

DETAILED DESCRIPTION OF THE DISCLOSURE

Figure 1:
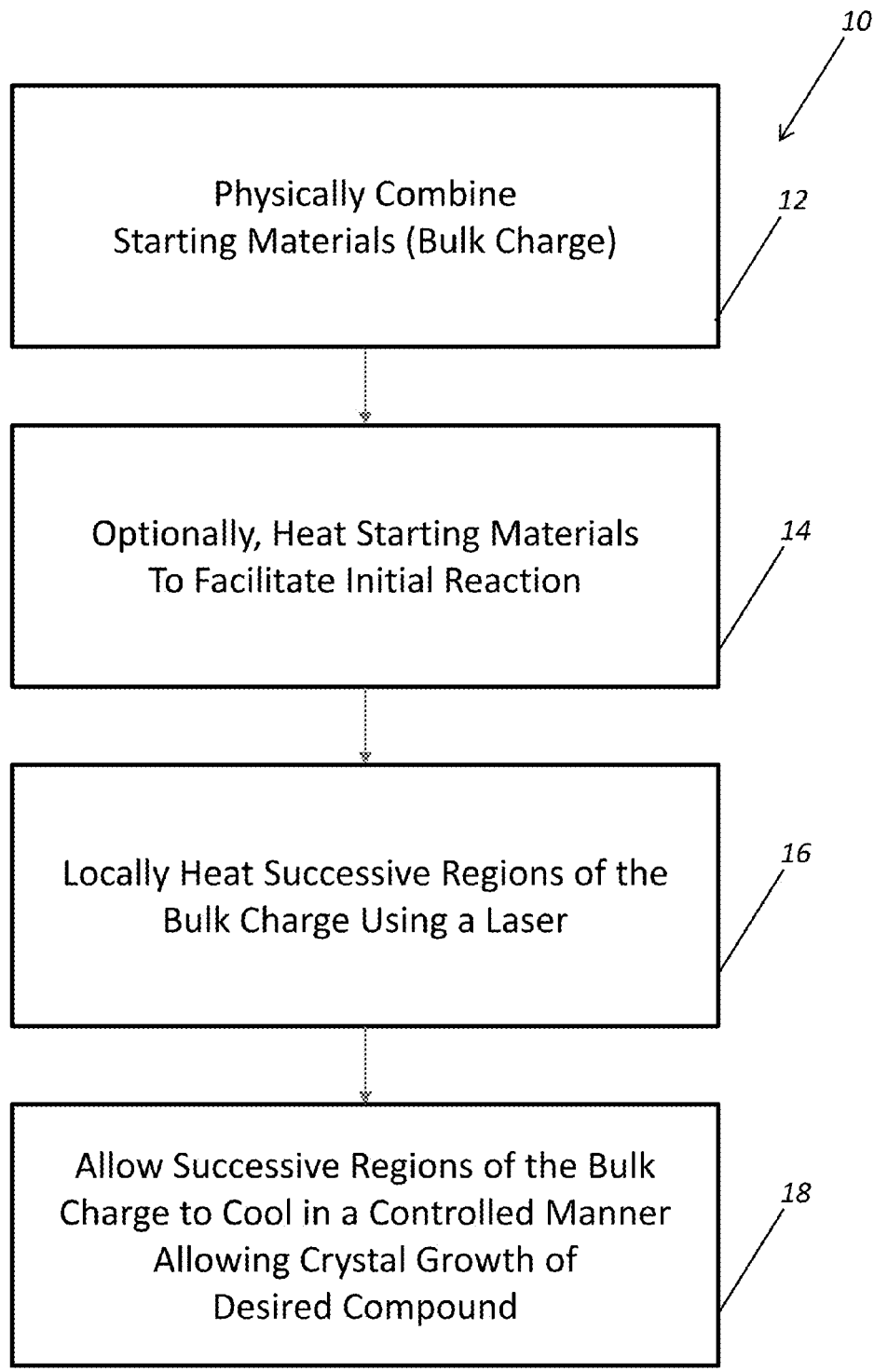
FIG. 1 is a flowchart illustrating one exemplary embodiment of the method for the additive manufacturing of inorganic crystalline materials of the present disclosure, and specifically a heating embodiment.

Again, in various exemplary embodiments, the present disclosure provides methods and systems for the additive manufacturing of inorganic crystalline materials, rather than using time-consuming and costly bulk crystal growth, chemical vapor deposition, or high-vacuum vapor deposition techniques to grow such crystalline materials. Starting materials are physically combined and optionally thermally heated (in an oven/furnace) to facilitate the initial reaction. The starting materials may be elemental or reagent compounds. A directed heat source is then used to additively manufacture the crystals by precisely locally heating regions within the charge above the alloying point in succession, thus forming the final compound. Another approach is to synthesize the compound prior to additive manufacturing and then use the directed heat source to sequentially take very small regions above the melting point in order to melt the material in succession. As the directed heat source moves to an adjacent region within the charge, the previous location begins to cool and crystallize. Various laser wavelengths or other energy regimes may be used to optimize additive manufacturing conditions, as each crystalline material absorbs different wavelengths or reacts differently. In this manner, exotic designs may be manufactured and localized defects may be removed.

Thus, the present disclosure provides for precise microcrystallization within a bulk chemical charge of material which is propagated to form a single crystal with the desired semiconducting, optical filtering, or scintillation properties. A laser is used to heat or melt a small portion of the bulk compound and, as the beam is propagated spatially through the charge, the melted region slowly cools, causing crystallization. Controlling the laser intensity, translation speed, and wavelength dictates the energy input, local temperature within the sample, and cooling rate to optimize crystallization. Importantly, this process further results in micro-zone-refining of the sample, which results in removing impurities from the crystal by translating them through the bulk of the charge.

Thermal heat may be applied to the starting materials, which may be elemental or compound reagents, followed by additive manufacturing, to develop an external heating profile (in an oven/furnace) that preheats the material to near the melting point, followed by the use of a directed heat source to precisely heat a small region to above the melting point for synthesizing the compound and for crystal growth. Alternatively, the desired compound may be synthesized by traditional means prior to additive manufacturing. The additive manufacturing process may be used to grow the crystal. Hybrids of these approaches may also be used. It is further expected that this process will result in micro-zone-refining (i.e., micro-purification) of the sample, which results in removing impurities from the crystal by translating them through the bulk of the charge. Zone-refining is a known technique on the bulk level for removing impurities by slowly moving a material through a temperature gradient surrounding the melting point of a crystalline solid. Impurities move through the material based of dissolution properties. Micro-zone-refining uses the same impurity segregation phenomenon as typical zone-refining, but on a localized spatial level.

Figure 3:
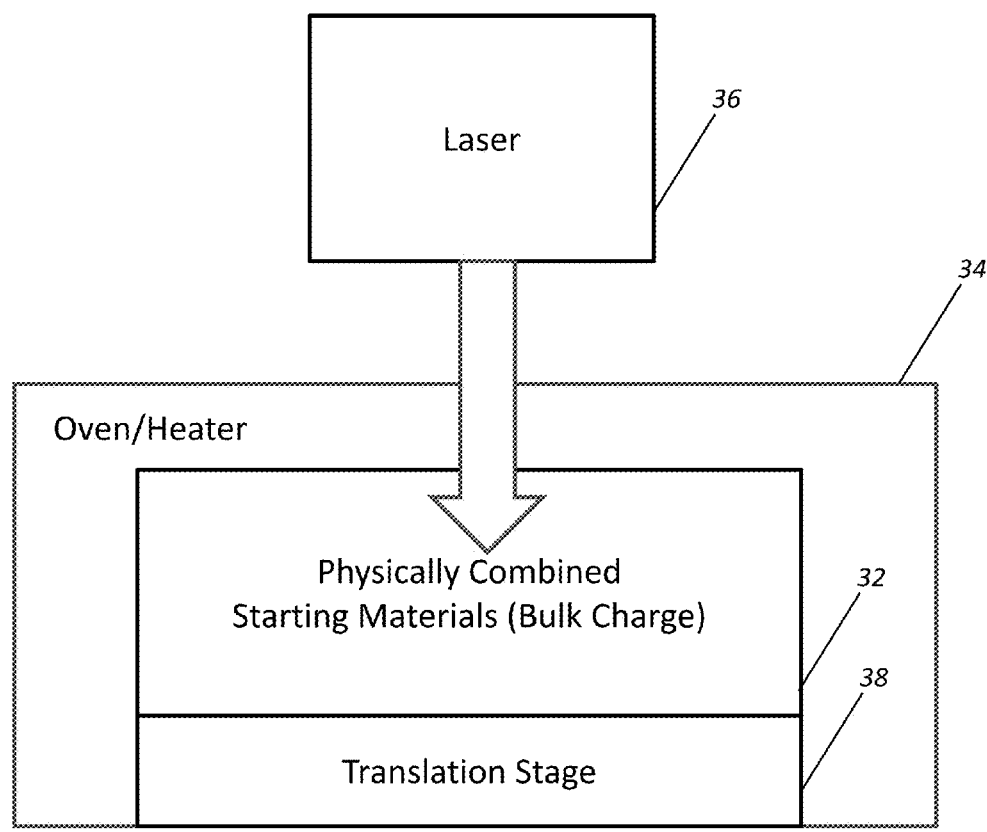
FIG. 3 is a schematic diagram illustrating one exemplary embodiment of the system for the additive manufacturing of inorganic crystalline materials of the present disclosure.

Referring now specifically to FIG. 1, in one exemplary embodiment, the method 10 of the present disclosure includes physically combining the starting materials (bulk charge) 32 (FIG. 3) that are used to form the semiconductor or crystal 18 (Block 12). Optionally, these starting materials 32 are first heated in an oven/heater 34 (FIG. 3), given a predetermined heating profile, such that initial reaction of the starting materials 32 is facilitated (Block 14). Subsequently, successive regions of the bulk charge 32 (or selected regions in the case of defect remediation) are heated using a laser or other directed heat source 36 (FIG. 3) (Block 16), again facilitating the reaction of the bulk charge 32. Either the bulk charge 32 or the directed heat source 36 may be translated from location to location via a translation stage 38 (FIG. 3). Finally, each region of the bulk charge 32 is allowed to cool in a controlled manner, such that the desired crystalline compound results (Block 18). By controlling the heating/cooling temperatures and rates appropriately, one or more of the mechanical, electrical, photonic, and optical properties of the crystalline compound may be precisely controlled. Controlling the heating/cooling can be done with an external oven or furnace, or using the localized heat generated by the directed heat source 36. The thermal gradient falls away rapidly as one moves away from the laser focal point or other directed heat source zone of influence. The directed heat source 36 heats the material enough locally to melt/synthesize the final compound and the maximum temperature/temperature gradient from the directed heat source 36 defines crystallinity and other properties. Laser wavelength or other energy characteristics may also be used to control energy exposure. In this manner, defects can be avoided/corrected, etc.

Figure 2:
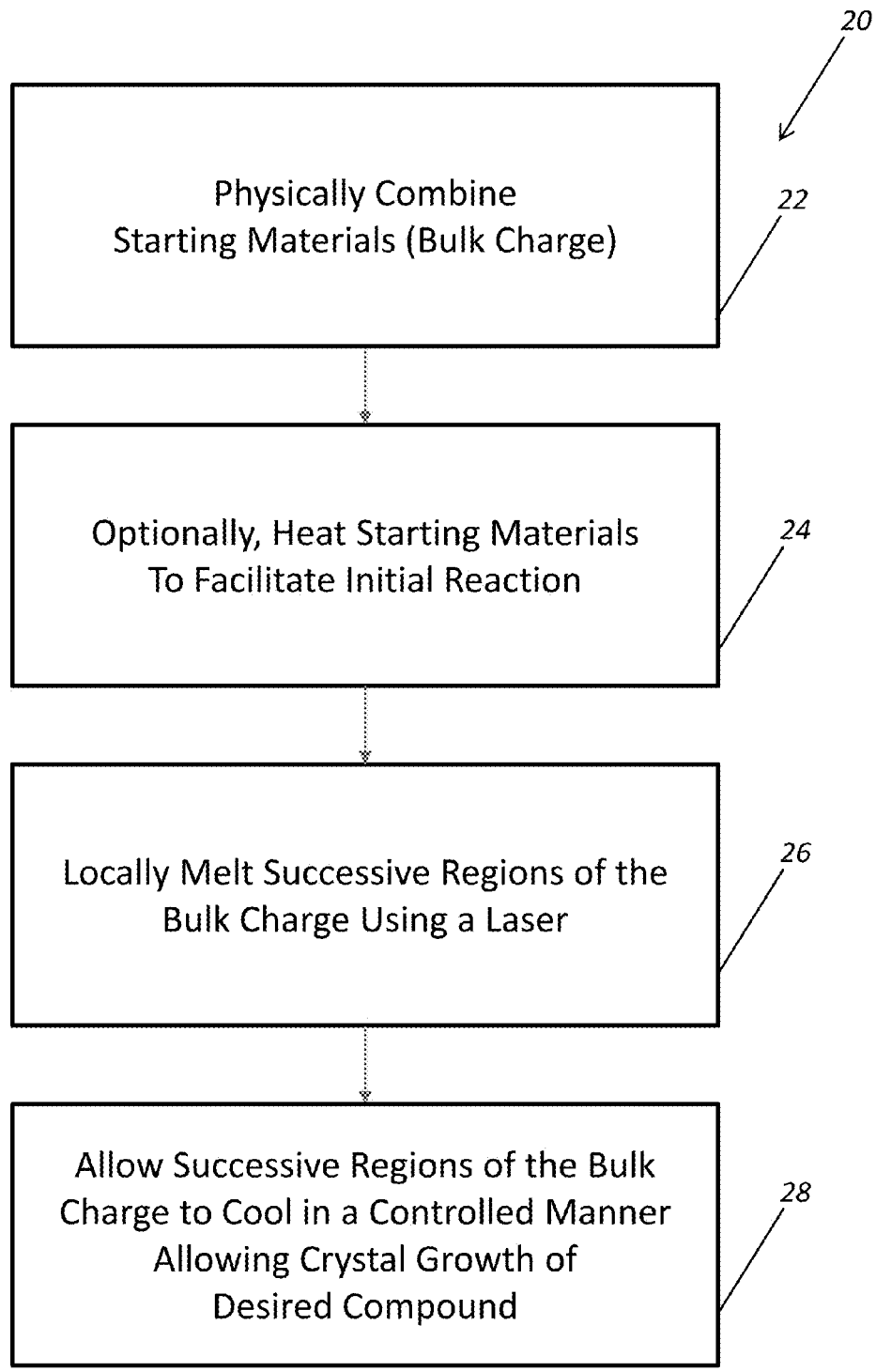
FIG. 2 is a flowchart illustrating one exemplary embodiment of the method for the additive manufacturing of inorganic crystalline materials of the present disclosure, and specifically a melting embodiment.

Referring now specifically to FIG. 2, in another exemplary embodiment, the method 20 of the present disclosure includes physically combining the starting materials (bulk charge) 32 (FIG. 3) that are used to form the crystal 28 (Block 22). Optionally, these starting materials 32 are first heated in an oven/heater 34 (FIG. 3), given a predetermined heating profile, such that initial reaction of the starting materials 32 is facilitated (Block 24). Subsequently, successive regions of the bulk charge 32 (or selected regions in the case of defect remediation) are melted (Block 26) using a laser or other directed heat source 36 (FIG. 3) or other directed heat source 26, again facilitating the reaction of the bulk charge 32. Either the bulk charge 32 or the directed heat source 36 may be translated from location to location via a translation stage 38 (FIG. 3). Finally, each region of the bulk charge 32 is allowed to cool in a controlled manner, such that the desired crystalline compound results (Block 28). Again, by controlling the heating/cooling temperatures and rates appropriately, one or more of the mechanical, electrical, photonic, and optical properties of the crystalline compound may be precisely controlled. Laser wavelength or other energy characteristics may also be used to control energy exposure. In this manner, defects can be avoided/corrected, etc.

By way of non-limiting example, in the traditional formation of 6LiInSe2, a semiconducting radiation detection crystal, ultra-high purity starting materials are needed in order to create a final crystal that has sufficient semiconducting radiation detection properties. In order to achieve the desired purity in the resulting 6LiInSe2 crystal, the highest quality starting materials are obtained. They are then further chemically purified via distillation and finally zone-refined to remove any lingering impurities. The elements are then combined in a two-step synthesis procedure designed to eliminate secondary phases that act as defects. Finally, a long bulk crystal growth is undertaken, to achieve a single crystalline boule which must be cut and fabricated into detection crystals. In contrast, the disclosed method herein would eliminate most of the aforementioned steps. The micro-zone-refining which takes place during additive manufacturing of the crystal reduces somewhat the necessity of starting with high purity materials because purification occurs in situ. Further, synthesis and growth occur locally so that precise shapes are fabricated in situ without the post-growth cutting and fabrication.

Thus, the present disclosure provides for precise micro-crystallization within a bulk chemical charge of material that is propagated to form a single crystal with the desired semiconducting, scintillation, laser crystal, or optical filtering properties. A laser or other directed heat source is used to melt a small portion of the bulk compound and, as the beam or area of influence is propagated spatially throughout the charge, the melted region slowly cools, causing crystallization. Controlling the directed heat source intensity, translation speed, wavelength, etc. dictates the energy input, local temperature within the sample, and cooling rate to optimize crystallization. Further, additive manufacturing may be used as a micro-purification (i.e., micro-zone-refining) technique during growth.

Again, thermal heat may be applied to the starting materials, which may be elemental or compound reagents, followed by additive manufacturing, to develop an external heating profile (in an oven/furnace) that preheats the material to near the melting point, followed by the use of a directed heat source to precisely heat a small, localized region to above the melting point for synthesizing the compound and for crystal growth. Alternatively, the desired compound may be synthesized by traditional means prior to additive manufacturing. The additive manufacturing may be used to grow the crystal. Hybrids of these approaches may also be used. Further, additive manufacturing may be used as a micro-purification (i.e., micro-zone-refining) technique during growth.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for the additive manufacturing of inorganic crystalline materials, comprising:
   physically combining a plurality of starting materials that are used to form an inorganic crystalline compound;
   heating or melting successive regions of the combined starting materials using a directed heat source having a predetermined energy characteristic, thereby facilitating the reaction of the combined starting materials; and
   allowing each region of the combined starting materials to cool in a controlled manner, such that the desired inorganic crystalline compound results.

2. The method of claim 1, further comprising, prior to heating or melting the successive regions of the combined starting materials using the directed heat source, heating the combined starting materials in an oven or heater to facilitate initial reaction of the combined starting materials.

3. The method of claim 1, further comprising translating the combined starting materials and/or the directed heat source between successive locations.

4. The method of claim 1, further comprising controlling directed heat source energy exposure and/or cooling profile to control one or more of the mechanical, electrical, photonic, and optical properties of the inorganic crystalline compound.

5. The method of claim 1, wherein the directed heat source comprises one of a laser, an electron beam, and an infrared radiation source.

6. The method of claim 1, wherein the inorganic crystalline compound is configured for use as one of a semiconductor, scintillator, laser crystal, and an optical filter.

7. A method for the additive manufacturing of inorganic crystalline materials, comprising:
   physically combining a plurality of starting materials that are used to form an inorganic crystalline compound;
   heating the combined starting materials in an oven or heater to facilitate initial reaction of the combined starting materials;
   heating or melting successive regions of the combined starting materials using a directed heat source having a predetermined energy characteristic, thereby facilitating the reaction of the combined starting materials; and
   allowing each region of the combined starting materials to cool in a controlled manner, such that the desired inorganic crystalline compound results.

8. The method of claim 7, further comprising translating the combined starting materials and/or the directed heat source between successive locations.

9. The method of claim 7, further comprising controlling directed heat source energy exposure and/or cooling profile to control one or more of the mechanical, electrical, photonic, and optical properties of the inorganic crystalline compound.

10. The method of claim 7, wherein the directed heat source comprises one of a laser, an electron beam, and an infrared radiation source.

11. The method of claim 7, wherein the inorganic crystalline compound is configured for use as one of a semiconductor, scintillator, laser crystal, and an optical filter.

* * * * *